Patented Sept. 28, 1948

2,450,171

UNITED STATES PATENT OFFICE 2,450,171

COMPOSITION OF FRICTION MATERIAL

Thornton R. Stenberg, Troy, N. Y., assignor to Bendix Aviation Corporation, South Bend, Ind., a corporation of Delaware No Drawing. Application September 20, 1944, Serial No. 555,019

1 Claim. (Cl. 106—36)

This invention relates to brake linings, and particularly to the composition thereof.

An object of the invention is to produce a brake lining material having improved holding and wear characteristics.

Another object of the invention is to produce a brake lining material having as its friction producing ingredient a vegetable material prepared from the nut of the tung plant.

Another object is to produce a novel material containing a mixture of tung nut powder (hereinafter referred to as tung pomace) and asbestos fibre, with sufficient liquid resin added thereto to produce a product having sufficient tensile strength to remain intact during use as a brake lining or the like.

I have found the following proportions to be such as to produce the desired results:

|  | Percent |
|---|---|
| Asbestos fibre | 66 to 74 |
| Tung pomace | 14 to 6 |
| Resin | 20 to 15 |

The amount of pomace is varied within the limits shown to vary the frictional action and wear of the lining. The greater the amount of pomace, the higher the frictional value of the lining and the longer the wear.

The amount of resin is varied within the limits shown to compensate for humidity in the air, character of asbestos fibre and degree of ground fineness of tung pomace.

The tung pomace is first roasted to burn off all oil remaining therein after pulverization, as the tung oil would interfere with the efficiency of the pomace as a friction producing element. The pomace is then added, dry, to the asbestos fibre in the ratios indicated in the foregoing formula. The dry mixture of asbestos fibre and tung pomace is tumbled in a dough mixer for fifteen minutes. The proper amount of liquid resin is poured into this mix while it is running. The three ingredients are mixed for one-half hour and then put in closed containers for transport to and storage at the extruding machine or other apparatus for molding the mixture into its desired shape for use as a brake lining or the like.

I claim:

A material for the purpose described, having the following constituency:

|  | Percent |
|---|---|
| Asbestos fibre | 66 to 74 |
| Dried and ground tung pomace | 14 to 6 |
| Resin | 20 to 15 |

THORNTON R. STENBERG.

REFERENCES CITED

The following references are of record in the file of this patent:

UNITED STATES PATENTS

| Number | Name | Date |
|---|---|---|
| 542,414 | Kinzer, Jr. | July 9, 1895 |
| 909,617 | Laeufer, et al. | Jan. 12, 1909 |
| 1,851,036 | Brackett | Mar. 29, 1932 |
| 2,185,333 | Denman | Jan. 2, 1940 |